Patented July 14, 1925.

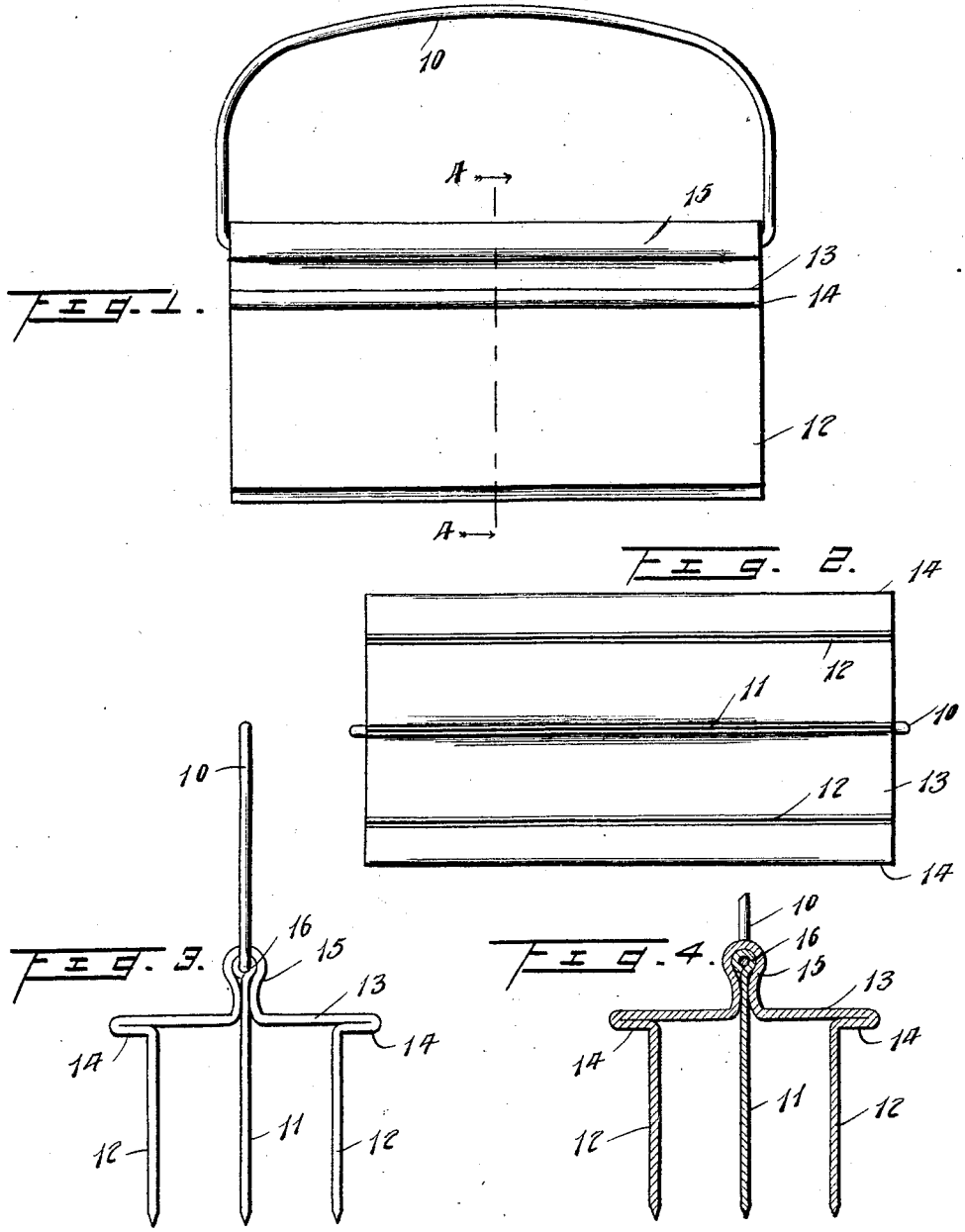

1,546,035

UNITED STATES PATENT OFFICE.

AMALIA A. SILLERS, OF CLYDE, NORTH DAKOTA.

COOKED-POTATO CHOPPER.

Application filed September 23, 1924. Serial No. 739,318.

*To all whom it may concern:*

Be it known that I, AMALIA A. SILLERS, a citizen of the United States, residing at Clyde, in the county of Cavalier and State of North Dakota, have invented certain new and useful Improvements in Cooked-Potato Choppers; and I do hereby declare the following to be a full, clear, and exact description of the invention, such as will enable others skilled in the art to which it appertains to make and use the same.

The present invention relates to an implement or kitchen utensil for use in the preparation of food and provides a chopper for separating vegetables and more particularly potatoes after the same have been placed in a pan or skillet thereby minimizing the number of dishes utilized in the preparation of food besides providing an article which may be readily cleaned and used generally for chopping food.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a side view of a food chopper embodying the invention,

Figure 2 is a view of the chopper as seen from the bottom side,

Figure 3 is an end view of the chopper, and

Figure 4 a sectional view on the line 4—4 of Figure 1.

Corresponding and like parts are referred to in the following description and designated in the several views of the drawings by like reference characters.

The chopper is formed from sheet metal of suitable gauge and comprising essentially three parts such as a handle 10, an intermediate blade 11, and a plate bent substantially as shown to provide outer blades 12, a head 13 lateral flanges 14 and an upwardly disposed fold or crimp 15 which receives the upper portion of the intermediate blade 11 and the lower portion of the handle 10 connected thereto.

The handle 10 consists of a stout wire bent into the shape of a bail and having the lower portion fitted within a roll 16 at the upper edge of the blade 11.

The upwardly disposed fold or crimp 15 is enlarged to receive the roll 16 and is contracted to grip the edge portion of the blade 11 adjacent the roll 16 and in this manner the blade 11 is firmly held in place and is readily detachable from the main portion of the article to admit of the same being readily cleaned, the lateral flanges 14 consist of folds of the plate and serve to reinforce opposite edge portions of the head 13 and to sustain the stress on the blades 12 when the implement is in operation.

After the potatoes have been placed in a skillet or pan, the implement may be used for chopping and agitating the same, thereby preventing the use of extra dishes to hold the food when cut into pieces before being placed into the pan or skillet to be cooked. While the implement is particularly adapted for use in the manner stated, nevertheless, it is to be understood that the same is adapted for general use for chopping food in the preparation of the same for cooking.

What is claimed is:—

1. A food chopper comprising a head having an upwardly disposed fold or crimp and having offstanding portions forming blades, and an intermediate blade having its upper portion retained in place by being inserted within the said fold or crimp.

2. A food chopper comprising a head having an upwardly disposed fold or crimp and having offstanding portions forming blades, an intermediate blade having its upper portion retained in place by being inserted within the said fold or crimp, and a handle in the form of a bail and having its lower portion fitted in a roll at the top edge of the intermediate blade and confined within the said fold or crimp.

3. A food chopper comprising a plate bent to provide a head, lateral flanges, outer blades and an intermediate upstanding fold or crimp, and an intermediate blade having its upper portion formed in a roll and confined within the said fold or crimp.

4. A food chopper comprising a plate bent to provide a head, lateral flanges, outer blades and an intermediate upstanding fold or crimp, an intermediate blade having its upper portion confined within the said fold or crimp, and a handle consisting of a stout wire bent into the form of a bail and having its lower portion fitted in a roll at the upper edge of the intermediate blade and confined therewith within the said fold or crimp.

In testimony whereof I affix my signature in presence of two witnesses.

AMALIA A. SILLERS.

Witnesses:
   CHAS. SILLERS,
   WM. DUNCAN.